United States Patent
Overholt et al.

(10) Patent No.: US 8,622,604 B1
(45) Date of Patent: Jan. 7, 2014

(54) WARMING ELEMENTS FOR THE BEATERS OF A MIXER

(76) Inventors: Steven D Overholt, Erie, PA (US); Maureen B Reynolds, Erie, PA (US)

(*) Notice: Subject to any disclaimer, the term of this patent is extended or adjusted under 35 U.S.C. 154(b) by 0 days.

(21) Appl. No.: 13/425,372

(22) Filed: Mar. 20, 2012

Related U.S. Application Data

(63) Continuation-in-part of application No. 12/166,694, filed on Jul. 2, 2008, now Pat. No. 8,136,979.

(51) Int. Cl.
  *B01F 15/06* (2006.01)
(52) U.S. Cl.
  USPC .......................... 366/146; 366/144
(58) Field of Classification Search
  USPC ................................. 366/146, 144
  See application file for complete search history.

(56) References Cited

U.S. PATENT DOCUMENTS 8,136,979 B1 * 3/2012 Reynolds ..................... 366/146

* cited by examiner

*Primary Examiner* — Yogendra Gupta
*Assistant Examiner* — John Robitaille
(74) *Attorney, Agent, or Firm* — Richard K Thomson

(57) ABSTRACT

A mixer for mixing food items and ingredients includes beaters removably attachable to the mixer, and the beaters including arms and mixing blades and extending along and wrapping about the arms and mixing blades of each beater is a heating element, preferably electrical wiring or leads, that is embedded in and covered by a heat conductive material such as ceramic, so that the heating element and the heat conductive material can warm up and bring to room temperature the various food items and ingredients for more efficient and quicker food preparation and processing when the beaters are immersed in or submerged within the items or ingredients and the heating element is actuated for producing heat that conducts through the heat conductive material to the food items and ingredients.

9 Claims, 5 Drawing Sheets

WARMING ELEMENTS FOR THE BEATERS OF A MIXER

This application is a continuation-in-part of U.S. patent application Ser. No. 12/166,694 filed Jul. 2, 2008, now U.S. Pat. No. 8,136,979.

FIELD OF THE INVENTION

The present invention pertains to food processing appliances and devices, and more particularly pertains to a heated mixer having heating and warming elements that are incorporated and integrated with the blades of the mixer.

BACKGROUND OF THE INVENTION

One of the primary factors and steps in the cooking and baking process for any food ingredient or food item is to make certain that the food ingredient or food item has been brought up to room temperature, and then after it has been brought to room temperature to mix it to obtain the appropriate consistency and texture. Because of their ease of use and ubiquity microwave ovens are the device most commonly used to warm frozen or cold food items to room temperature. However, microwave ovens are not the best or most efficient means to warm frozen or cold food items as they work by heating the food item from the inside out at extremely high temperatures (microwave ovens cause the water molecules in all food items to vibrate at almost 2500 million times a second thereby causing the food item to absorb energy and quickly heat). Because of the very high heat produced by microwave ovens, one must carefully monitor the warming and heating of the food item so that the food item isn't overheated and ruined. This concern also applies to warming up food ingredients such as mixes, butter, margarine, cream cheese, etc., food ingredients that may come in blocks, sticks, or pads and which require warming and partial softening for use. Thus, a more efficient way to warm up and soften food items and ingredients is desired that considerably shortens to time period of food item warm up and also does not ruin the food item or ingredient by destroying the natural consistency and texture of the food item or ingredient. Thus, the prior art discloses a range of devices that pertain to mixers, and not microwave ovens, for warming and softening food items and food ingredients.

For example, the Jensen Patent (U.S. Pat. No. 1,692,270) discloses an apparatus for treating liquids that includes an electrically energized heating element that is carried through a tubular metallic member.

The Willat et al. Patent (U.S. Pat. No. 1,845,692) discloses a liquid heating and circulating device for immersion in a liquid such as oil for heating and circulating the liquid that is stored in a vessel not readily adaptable for external heat application.

The Galajda, Jr. Patent (U.S. Pat. No. 3,109,913) discloses an electrically heated mixing service that combines a heating function with a mixing function that applies heat from the heating element to the shaft and consequently through the agitator blades of the mixer. The Cairclli Patent (U.S. Pat. No. 3,586,819) discloses a combination of food mixer and heater includes both beater elements and separate heating elements extending outwardly from the housing unit.

The Cairelli Patent (U.S. Pat. No. 3,589,834) discloses a helical blade mixer that includes helical intenneshing blades on each shaft and a heating device that is used in conjunction with the helical blades of the mixer.

The Duncan et al. Patent (U.S. Pat. No. 5,368,384) discloses a hand-held mixing device with a heating element in the form of a coil surrounding the blade of the mixer. Nonetheless, despite the ingenuity of the above devices, there remains a need for a mixer having heated mixing blades that warm and soften foods for enhanced food preparation and cooking.

SUMMARY OF THE INVENTION

The present invention comprehends a heated mixer having electric heating elements wrapped about the mixing blades and protectively coated with a heat conductive material for warming and bringing to room temperature various types of food items and ingredients thereby enhancing the cooking, baking, and food preparation process.

Thus, the present invention includes a mixer of any conventional type with the mixer having a body that includes a handle or hand gripping portion for holding the mixer adjacent a bowl, pot, saucepan, etc. At least two beaters are removably attachable to mounting receptacles located on the underside of the mixer, and each beater includes at least two mixing blades. Each beater includes an electrical heating adapter having a pair of electrical contacts projecting therefrom for engaging corresponding electrical contacts located within the mounting receptacle thereby completing a circuit so that heat can be conveyed to the entire beater. The mixing blades of the beaters interleave and overlap each other so that they continuously mIX food items and ingredients during their operation. Also located at the base of each beater is a protective disc against which the individual can place his or her hand when attaching the beaters to the mounting receptacles located on the underside of the mixer.

Extending alongside the stem or arm and about the external surface of the mixing blades of each beater is a heating element such as an electrical lead or wiring. The heating element is electrically connected to the respective electrical contacts of the electric heating adapter at the base of each beater. The external surface of the beaters is covered or coated with a readily heat conductive material such as a ceramic coating thereby completely covering the heating element. To provide for a more specific warming and heating of any food item or ingredient, the mixer can include a three position-heating switch that includes a low heat position, a medium heat position, and a high heat position. An electrical converter within the mixer regulates the amperage/voltage to the electrical heating adapter and thence to the heating elements thereby preventing the mixer from overheating and also preventing a drain on power that would inhibit the proper operation of the beaters.

It is an object of the present invention to provide a mixer that allows heat in a controlled manner to conduct to the mixing blades of each beater for warming up cold foods.

It is another object of the present invention to provide a mixer that includes heated mixing blades for warming cold food to room temperature in minutes instead of hours.

It is yet another object of the present invention to provide a mixer with heated beaters that significantly reduce the amount of time it takes to prepare the key ingredients of a dish or meal before baking.

It is still yet another object of the present invention to provide a mixer that is ideal for warming up and softening such food items as butter, margarine, cream cheese, and solid chocolate.

Still another object of the present invention is to provide a mixer that provides an alternative to microwave heating wherein the heated mixing blades of the beaters do not cook the food item from the inside out which alters the texture and consistency of the food item and oftentimes ruins the texture and taste of the food item.

Still yet another object of the present invention is to provide a mixer with heated beaters that don't cook the food items and food ingredients but gradually warm and soften the food items and food ingredients thereby producing a smooth and creamy texture.

Another object of the present invention is to provide a mixer with heated beaters for making the baking process easier and more convenient and ultimately saving the individual valuable time in today's hurried world.

These and other objects, features, and advantages will become apparent to those skilled in the art upon a perusal of the following detailed description when read in conjunction with the accompanying drawing figures and appended claims.

DETAILED DESCRIPTION OF THE PREFERRED EMBODIMENT

Illustrated in FIGS. 1 through 4 is a mixer 10 that includes heating and warming elements for warming all types of food items and ingredients that are cold and which need to be brought to room temperature in a relatively short time period (minutes in contrast to the hours it would take if the food items and ingredients are allowed to warmup on their own). Warming elements 38 of the present invention are incorporated with beaters 20 of mixer 10 for accelerating the food preparation and processing time, and do not adversely affect the quality (texture, taste, consistency) of the food items or ingredients as often occurs when warming and heating food items in the microwave.

Figure 1:
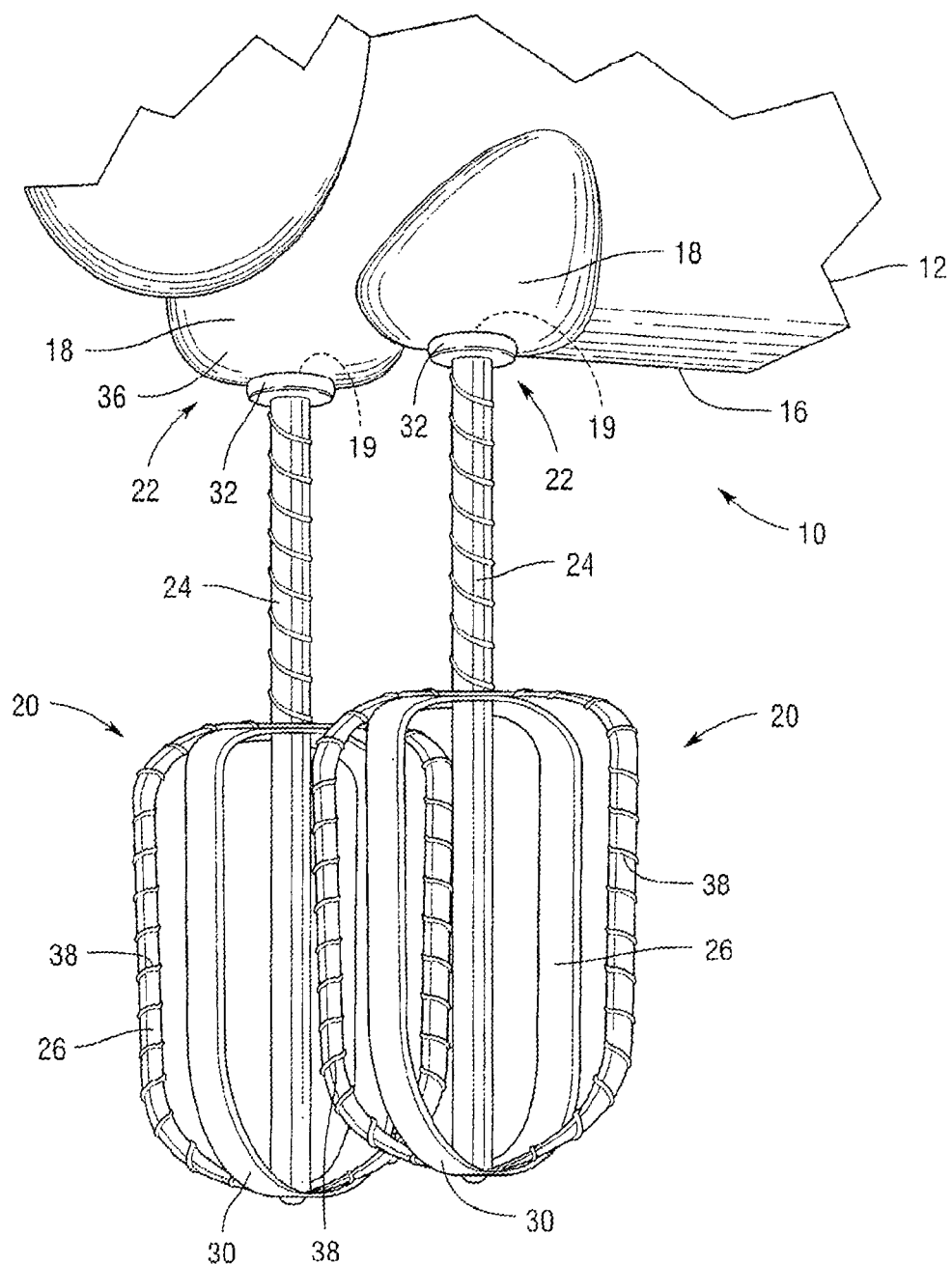
FIG. 1 is a perspective view of the mixer having heated beaters of the present invention illustrating the heating elements wrapped about the mixing blades of the mixer.
Figure 4:
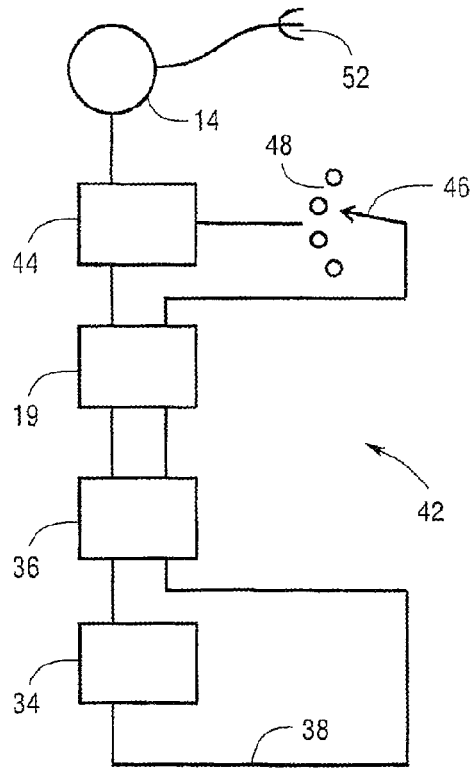
FIG. 4 is an electrical schematic of the mixer having heated beaters of the present invention.
Figure 4A:
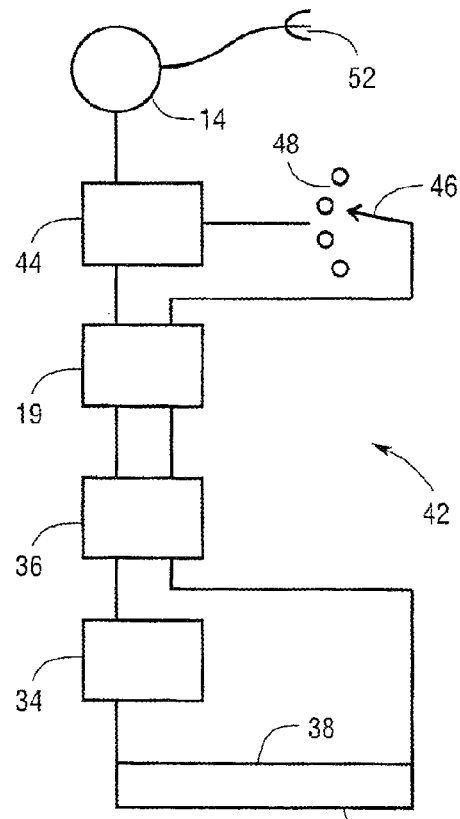
FIG. 4A is an electrical schematic of the mixer having all blades of the beaters heated.

Thus, shown in FIGS. 1 and 4 is standard mixer 10 that includes a body portion 12, an electrical plug 52, an on/off switch 48, and a multi-position speed control switch 46 (shown in the schematic FIGS. 4 and 4A). A power source such as a motor 14 is encased within body of mixer 10, and mixer 10 includes an underside 16 having at least two protrusions 18. A pair of beaters 20 is removably attachable to respective mounting receptacles 19 located on protrusions 18.

Each beater 20 includes a base 22, a stem or arm 24 and at least one pair of mixing blades 26 that are disposed at an angle usually equal to or less than 90° to each other. Each mixing blade 26 includes an inner end 28 and an opposite distal end 30. When mixing and processing food items and products most of the surface area of blades 26 are submerged or immersed in the food item or product. Located at base 22 is a protective disc 32 that the individual can push against when mounting beaters 20 to mounting receptacles 19 of protrusions 18.

Figures 2A, 2B:
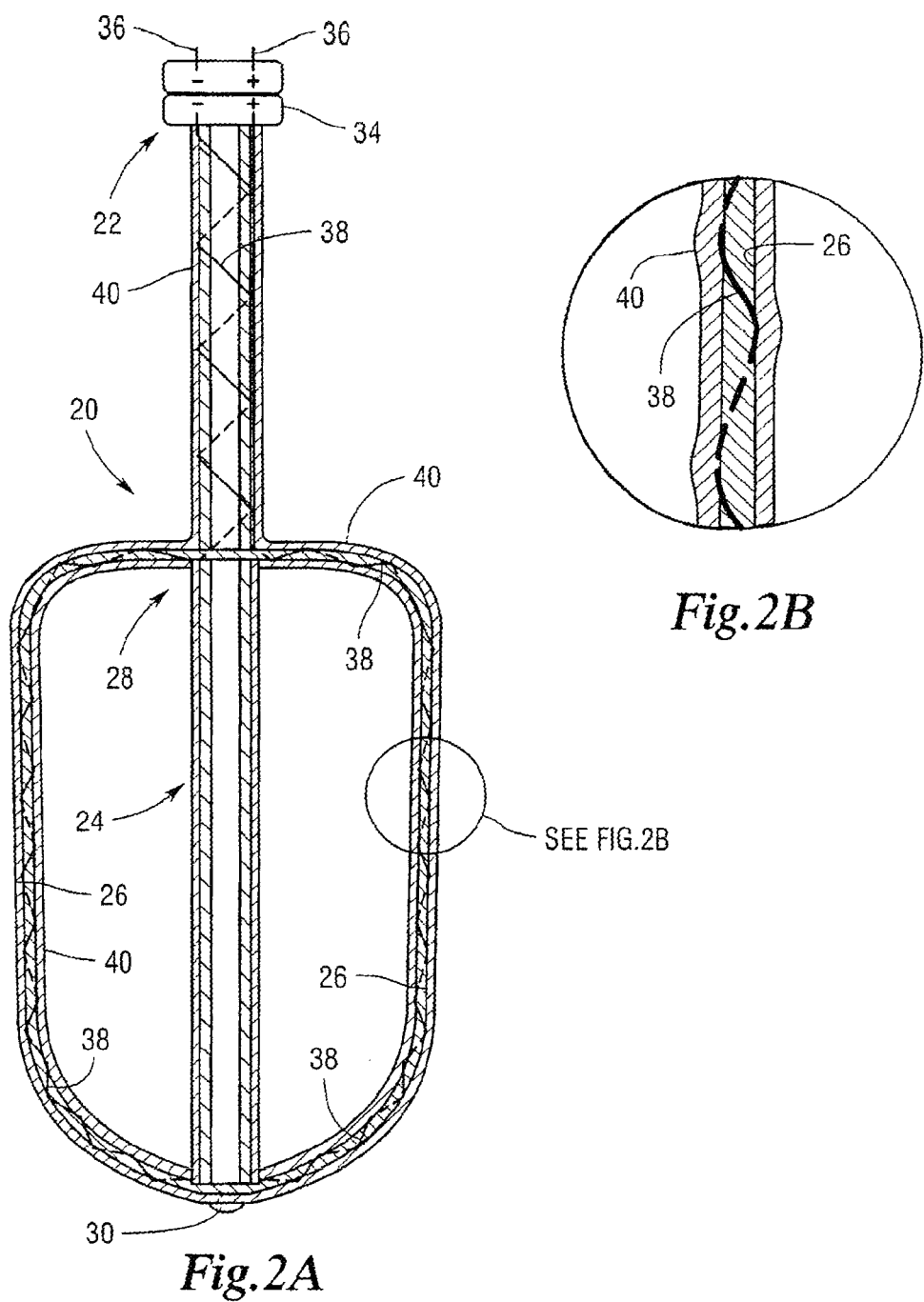
FIG. 2a is a sectioned elevational view of the mixer having heated beaters of the present invention illustrating the features of one individual mixing beater including the heating elements extending about the mixing blades and which are coated and covered with a ceramic coating.
FIG. 2b is an enlarged sectioned view of the mixer having heated beaters of the present invention illustrating the disposition of the heating element about the mixing blade and the heating element embedded within and covered by the ceramic coating.
Figure 3:
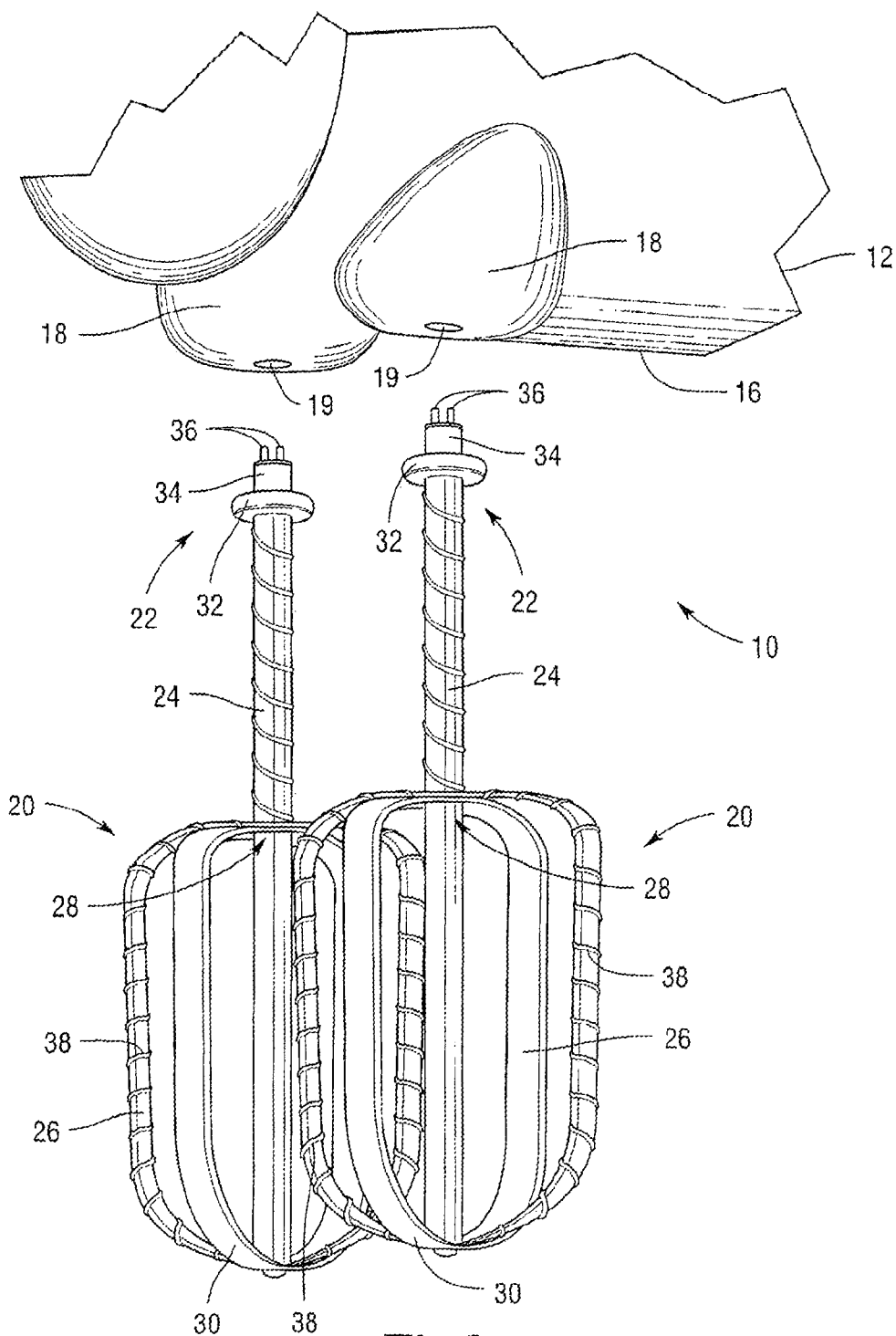
FIG. 3 is a perspective view of the mixer beaters having all blades of the beaters heated and also illustrating the electrical contacts at the base of the beaters.

As shown in FIGS. 2a and 3, each beater 20 includes an electric heating adapter 34 for regulating electric current, and protruding from electric heating adapter 34 is a pair of electrical contacts 36 (positive and negative). Electrical contacts 36 engage contacts located within mounting receptacles 19 of protrusions 18 of mixer 10 when beaters 20 are attached to mixer 10 for completing an electrical circuit so that heat can be conveyed and distributed to arms 24 and mixing blades 26 of beaters 20.

As shown in FIGS. 1 through 2b, mixer 10 includes a warming element 38 that runs along arms 24 and mixing blades 26 of each beater 20 and essentially wraps about arms 24 and mixing blades 26 in a cylindrical or coiled manner. Warming element 38 of the preferred embodiment is an electrical lead or wiring, and a second lead or wiring can also extend and wrap about arm 24 and mixing blades 26 of each beater 20. Warming elements 38 are electrically connected to electrical contacts 36 via the electric warming adapter 34 located at base 22 of each beater 20.

As shown in FIG. 3 in another embodiment, mixer 10 includes warming elements 38 and 39, where element 38 runs along arm 24 and along oppositely disposed mixing blades 26 of each beater 20, and warming element 39 runs along the second pair of oppositely disposed mixing blades 26 of each beater 20, thereby essentially wrapping around all arms 24 and mixing blades 26 in a coiled manner.

In order to protect warming elements 38, and to more efficiently distribute or convey heat therefrom to whatever food item or food ingredient the mixing blades 26 are immersed in, heating element 38 is embedded within, coated and covered by a heat conductive coating 40 which may be a dipped insulation material or a ceramic coating material. In the preferred embodiment dipping material nylon 11 powder coating is used for heat conductive coating 40. Heat conductive coating 40 adheres to external surfaces of mixing blades 26 to produce a long lasting, chip and peel resistant coating or covering.

Heat conductive coating 40 must be able to tolerate and readily conduct heat as well as to completely cover warming elements 38 so that warming elements 38 are not exposed which would cause a safety problem and hazard. In one representative method of manufacture, warming elements 38 are wrapped about arms 24 and mixing blades 26 and then beaters 20 are completely submerged in and by the nylon, ceramic or other coating material up to the area adjacent base 22 and disc 32.

FIG. 1 shows warming elements 38 as exposed and extending about arms 24 and mixing blades 26 of both beaters 20, and FIGS. 2a and 2b show warming elements 38 extending about arms 24 and mixing blades 26 and covered by the heat conductive coating 40.

FIG. 4 illustrates a representative electrical schematic 42 for warming elements 38 that extend about arms 24 and blades 26 of beaters 20. A power converter 44 is interconnected to the prime mover—motor 14—of mixer 10 for regulating amperage/voltage to electric heating adapter 34 and thence to warming elements 38. In addition, mixer 10 can include a multi-position speed control switch 46, such as a three position switch, for more specific heat control. Multi-position speed control switch 46 can be mounted on housing or casing of mixer 10 and interconnected to motor 14 and conventional circuitry of electric mixer 10. Thus, multi-position speed control switch 46 can include settings for low heat, medium heat, and high heat for more specific heat regulation and production dependent on the type and quantity of the food item or ingredient being warmed. Multi-position switch 46 will also better accommodate variable warming and heating times for different varieties of food items and ingredients.

Figure 5A:
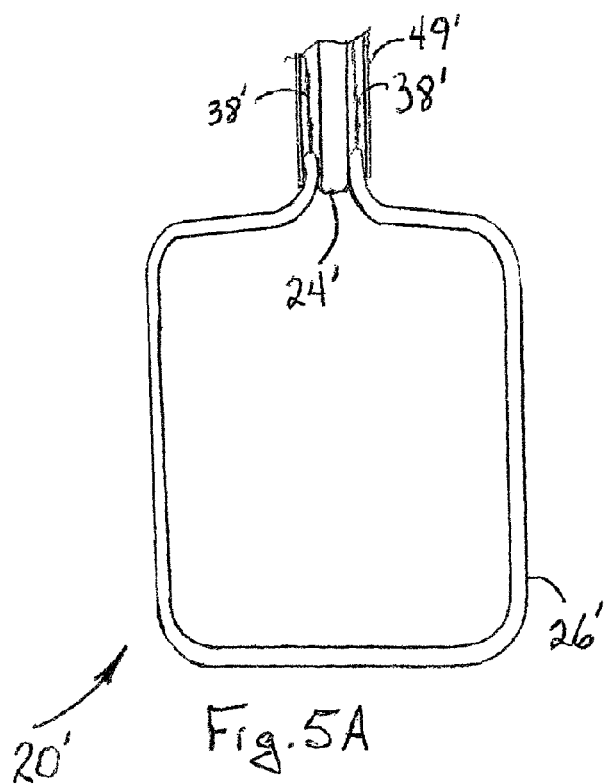
FIG. 5A is a perspective view of a second embodiment.
Figure 5B:
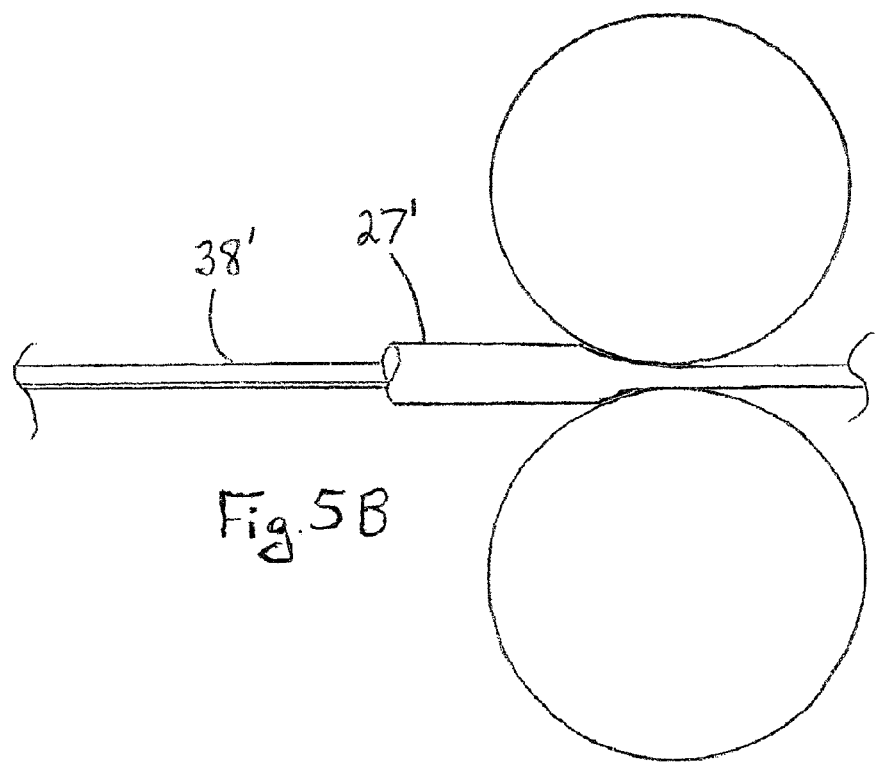
FIG. 5B is a schematic depiction of one method of manufacturing the second embodiment.

A second embodiment is depicted in FIGS. 5A and 5B generally at 20'. The coating 40 in the first embodiment will be selected for its durability in order to provide the longest useful life for beater 20 possible. However, it is the nature of coatings to chip and crack thereby limiting the length of time the beater 20 can be used. Further, the thickness of the coating will necessarily impede the amount of heat which may be delivered to the food being mixed. In this second embodiment the beater 20' has one or more pairs of mixing blades 26' (one being shown) which are formed from a tubular member 27' with the heating element 38' running through the inner portion of the flattened tube. By way of example, the heating element 38' may take the form of ni-chrome resistance wire or flat ribbon. In either case, the heating element 38' will be electrically insulated from the metallic tubular member 27'. The ends of the blades 26' are attached, as by tack welding, for example, to arm 24' and a non-conducting, protective sleeve 49' provided for the portion of the arm 24' and heating element 38' which extend upwardly toward the base of the mixer 10. By way of example, FIG. 5B depicts the tubular member 27' being formed by running the heating element 38' through the tubular member 27' and being flattened by one or more rollers. While the profile of the resulting mixing blade 26' is shown as being flat, it will be appreciated that any desired profile can be imparted during this process. Further, although the tubular member 27' is recited as being metallic, it will be appreciated that certain plastic or hybrid materials could be utilized as well. This design provides a more robust, longer lasting beater 20' as well as permitting a larger amount of heat to be imparted to the ingredients being mixed. The multi-position switch 46 employed in the first embodiment 20 may also be utilized with beater 20' and may include a separate button to allow the user to vary both the rate of rotation and the rate at which heat is imparted to the ingredients, separately. Additional alternatives to the disclosed embodiments would include a laminated metal design sandwiching the electrical conductor and a heat-conductive plastic outer member which remains rigid when heated up to the highest operating temperature of the device.

The present invention has been described with respect to preferred embodiments, and numerous modifications, alterations, and variations will occur to those skilled in the art upon reading and understanding the specification, and it is intended that all such modifications, alterations, and variations will be included in so far as they come within the scope of the claims or equivalents thereof.

We claim:

1. An electric mixer having at least one beater for warming food items and ingredients, comprising:
    each said beater having an arm and at least one flattened metallic hollow tubular blade;
    a warming element extending down alongside said arm of each said beater and through a center of said at least one flattened metallic hollow tubular blade of each said beater;
    an electric heating adapter engaging a base of each said beater;
    a pair of electrical contacts protruding from said electric heating adapter of each said beater and electrically interconnected to said warming element;
    whereby when said at least one blade of said at least one beater is immersed in the food items and ingredients and said at least one beater is actuated, said warming element causes heat to be conducted from said warming element through said hollow tubular blade to said food items and ingredients, such that said at least one blade of each said beater simultaneously mix and cause gradual warming of the food items and ingredients within a time period measured in minutes producing softening of some of the food items and ingredients.

2. The electric mixer of claim 1 wherein said mixer includes at least two beaters with each beater including a pair of blades positioned orthogonally to each other.

3. The electric mixer of claim 2 further comprising a multi-position switch mounted on said mixer and electrically interconnected to said warming elements extending alongside and wrapped about said arms running through said blades of each said beater.

4. The electric mixer of claim 3 wherein said multi-position switch includes a low heat setting, a medium heat setting, and a high heat setting.

5. The electric mixer of claim 4 wherein said warming elements are selected from a group consisting of electrically conductive wire and electrically conductive ribbon.

6. An electric mixer having beaters for warming food items and ingredients, comprising:
    each said beater having an arm and two pairs of opposed blades on said arm, each pair of opposed blades being formed as a flattened metallic hollow tubular member;
    a warming element extending down alongside said arm of each said beater and extending through at least one pair of said opposed blades of each said beater;
    an electric heating adapter engaging a base of each said beater, said heating adapter being electrically interconnected to said warming element of each said beater;
    a pair of electrical contacts protruding from said electric heating adapter and being electrically interconnected with said warming element; and,
    a coating material associated with one of said warming element and said flattened hollow tubular member to electrically isolate said flattened hollow tubular member;
    whereby when said blades of said beaters are engaged in the food items and ingredients and said beaters and said warming element for each said beater are actuated, heat is conducted from said warming element through said flattened hollow tubular element to the food items and ingredients, such that said blades of each said beater simultaneously mix and cause gradual warming of the food items and ingredients within a time period measured in minutes producing softening of some of the food items and ingredients.

7. The electric mixer of claim 6 further comprising a multi-position switch mounted on said mixer and electrically interconnected to said warming element of each said beater.

8. The electric mixer of claim 7 wherein said multi-position switch includes a low heat setting, a medium heat setting, and a high heat setting.

9. The electric mixer of claim 8 wherein each said warming element is selected from a group consisting of electrically conductive wiring and electrically conductive ribbon.

* * * * *